US006850940B2

(12) United States Patent
Wesinger, Jr. et al.

(10) Patent No.: US 6,850,940 B2
(45) Date of Patent: Feb. 1, 2005

(54) AUTOMATED ON-LINE INFORMATION SERVICE AND DIRECTORY, PARTICULARLY FOR THE WORLD WIDE WEB

(75) Inventors: Ralph E. Wesinger, Jr., San Jose, CA (US); Christopher D. Coley, Morgan Hill, CA (US)

(73) Assignee: Network Engineering Software, Inc., San Jose, CA (US)

(*) Notice: Subject to any disclaimer, the term of this patent is extended or adjusted under 35 U.S.C. 154(b) by 246 days.

(21) Appl. No.: 09/952,985

(22) Filed: Sep. 14, 2001

(65) Prior Publication Data

US 2002/0035564 A1 Mar. 21, 2002

Related U.S. Application Data

(63) Continuation of application No. 09/110,708, filed on Jul. 7, 1998, which is a continuation of application No. 08/572,543, filed on Dec. 14, 1995, now Pat. No. 5,778,367.

(51) Int. Cl.[7] ............................................. G06F 17/30
(52) U.S. Cl. ...................... 707/10; 707/104.1; 707/200; 709/217; 709/218; 709/219; 709/201; 715/513
(58) Field of Search ................................. 709/217, 218, 709/219, 201; 707/10, 104.1, 200; 715/513

(56) References Cited

U.S. PATENT DOCUMENTS

| | | | |
|---|---|---|---|
| 5,032,989 A | 7/1991 | Tornetta |
| 5,251,294 A | 10/1993 | Abelow |
| 5,339,361 A | 8/1994 | Schwalm |
| 5,339,392 A | 8/1994 | Risberg |
| 5,359,508 A | 10/1994 | Rossides |
| 5,406,475 A | 4/1995 | Kouchi |
| 5,412,774 A | 5/1995 | Agrawal |
| 5,414,809 A | 5/1995 | Hogan |
| 5,428,606 A | 6/1995 | Moskowitz |
| 5,428,778 A | 6/1995 | Brookes |

OTHER PUBLICATIONS

Towsend et al., Microsoft Office/Access, 1994, QUE Computer Publishing, pp. 615–618, 646–658, 670–679.*
Liu et al., Description and Recognition of Form and Automated Form Data Entry, vol. 2, Aug. 14–16, 1995, pp. 579–582.*
Brown, Browsing the Web with a Mail/News Reader, ACM, Nov. 14–17, 1995, pp. 197–198.*

(List continued on next page.)

Primary Examiner—Frantz Coby
(74) Attorney, Agent, or Firm—Sierra Patent Group, Ltd.

(57) ABSTRACT

A computer network and a database are used to provide a hardware-independent, dynamic information system in which the information content is entirely user-controlled. Requests are received from individual users of the computer network to electronically publish information, and input is accepted from the individual users. Entries from the users containing the information to be electronically published are automatically collected, classified and stored in the database in searchable and retrievable form. Entries are made freely accessible on the computer network. In response to user requests, the database is searched and entries are retrieved. Entries are served to users in a hardware-independent page description language. The entries are password protected, allowing users to retrieve and update entries by supplying a correct password. Preferably, the process is entirely automated with any necessary billing being performed by secure, on-line credit card processing. The user making a database entry has complete control of that entry both at the time the entry is made and in the future after the entry has been made. The entry, when served to a client, is transformed on-the-fly to the page description language. Where the page description language is HTML and the computer network is the World Wide Web, the entry may function as a "mini" homepage for the user that made the entry. Provision is made for graphics and other kinds of content besides text, taking advantage of the content-rich nature of the Web.

21 Claims, 25 Drawing Sheets

OTHER PUBLICATIONS

Preece, Survival of the Fittest: The Evolution of Multimedia User Interface, ACM Computing Surveys, vol. 27, No. 4, Dec. 1995, pp. 557–559.*

Arai et al., Retrieving Electronic Documents with Real–World Objects on InteractiveDESK, ACM Nov. 14–17, 1995, pp. 37–38.*

Welch et al., The Internet's World Wide Web and the Simulation Community A Surfing Lesson for Beginners, ACM, Winter 1995, pp. 1329–1332.*

Crane et al., Marine Data Entry, IEEE, 1983, pp. 124–128.*

CGI Resources, A Tour of HTML Form and CGI Scripts, 1995–1998, printed pp. 1–10.*

Google Groups, ©2002; Groups search results for "author:usx@spud.hyperion.com"; pp. 1–4.

Google Groups, ©2002; Group search results for "common gateway interface"; pp. 1–19.

CGI, The Common Gateway Interface; pp. 1–5.

Cailliau, R. (c.1995); W3C, "A Little History of the World Wide Web"; pp. 1–16.

CompuServe®, ©1991; "CompuServe Information Service for DOS Computers, Version 2, Users Guide"; pp. 1–15.

Baser, K., Cohen, S., Dayton, D., and Watkins, P. (1978). "On–Line Indexing Experiment at Chemical Abstracts Service: Algorithmic Generation of Articulated Index Entries from Natural Language Phrases". *J. Chem. Inf. Computer Science.* vol. 18, No. 1.

Berners–Lee, T. "The WorldWideWeb Browser"; pp. 1–4.

* cited by examiner-

The who's who of the World Wide Web

> WebBook

> Whois

> Traceroute

This page is brought to you by the guys from
_____ . Intelligent Computing for the Internet from The Internet Solution Provider.
(C)1995 SRMC.

WebWho's Whois

This is a WWW front end to the United States Whois database

| Valid Entry Type | Example... |
|---|---|
| Domain Name | |
| Machine Name | |
| Registered Handle | |
| Registered Name | |
| IP Address | |
| IP Network | |

209

Information to lookup: ← 211

Scientific Research Management Corp. (SRMC-DOM)
  1714 Ringwood Avenue
  San Jose, CA 95131

Domain Name: SRMC.COM

Administrative Contact:
    Lyke, Howie (HL39) (No mailbox)
    408 437-1800                        215
Technical Contact, Zone contact:
    Coley, Chris (CC339) ccoley@SRMC.COM
    408 437-1800

Record last update on 04-Jun-95            213
Record created on 13-Dec-94

Domain servers in listed order:

| | |
|---|---|
| NS.SRMC.COM | 205.138.192.10 |
| CASD.SRMC.COM | 205.138.192.252 |
| SWEB.SRMC.COM | 205.138.192.253 |
| SMAIL.SRMC.COM | 205.138.192.254 |

The InterNIC Registration Services Host contains ONLY
Internet information (Networks, ASN's, Domains, and POC's).
Please use the whois server at nic.ddn.mil for MILNET
Information.

FIGURE 2C

Navigational Aid

WebBook

Whois

Traceroute  ← 217

WebWho

This page is brought to you by the guys from ____.
Intellgent Computing for the Internet from The
Internet Solution Provider.
(C) 1995 SRMC.

| ICON | WebWho's Traceroute |
|---|---|

This is a WWW front end to the Traceroute utility
Enter the hostname or an address to trace a route to.

Host to traceroute to: 219 tracerpite to rs.internic.net (198.41.0.6), 30 hops max, 40 byte packets
1. r001-t3.srmc.com (205.138.192..1) 2ms 2ms 1ms
2. 204.70.48.49 (204.70.48.49) 20ms 116ms 83 ms
3. core-fddi-0.Bloomington.mci.net (204.70.2.129) 186 ms 27 ms 268ms
4. core1-hssi-2.LosAngeles.mci.net (204.70.1.141) 19ms 26ms 19ms
5. core-hssi-3.Washington.mci.net (204.70.1.178) 335ms 245ms 348ms
6. border1-fddi-0.Washington.mci.net (204.70.2.2) 87ms 87ms 86ms
7. suranet-wtn-ds3.Washington.mci.net (204.70.56.6) 87ms 88ms 87ms
8. wtn9-wtn8-cf.sura.net (128.167.7.9) 88ms 87ms 88ms
9. netsol-wtn9-cl.sura.net (192.221.63.90) 92ms 93ms 90ms
10. rs1.internic.net (198.41.0.6) 90ms 90ms 94ms

FIGURE 2E

Navigational Aid

WebBook

Whois

Traceroute

WebWho

This page is brought to you by the guys from ____.
Intellgent Computing for the Internet from The
Internet Solution Provider.
(C) 1995 SRMC.

WebBook

☒  - Search

☒  - Add

☒  - Update

☒  - Change password

☒  - Login

FIGURE 2G

Searching

☒ - Categories - Search by going through the categories list

☒ - Example - Search by querying each field of the entries

☒ - Keyword - Search by specifying a keyword

○ - MAIN   ○ - SEARCH   ○ - ADD   ○ - UPDATE

221

Choose a category

☒ BUSINESS - COMMERCIALS, FINANCE....

☒ RECREATION - recreation stuffs.

☒ WEBWHO95 - .

Display how many entries at a time?

○ - MAIN  ○ - SEARCH  ○ - ADD  ○ - UPDATE

FIGURE 2I

Choose a category

WEBWHO95

Sub-categories:

☒ INDEX -

Display how many entries at a time?

9250 entries available!

9240 entries more

○ -Topographical Pictures
○ -Xtoys
○ -Index - The SoftSource Files
○ -Computer ESP
○ -Against Computer/Video Games
○ -Arrgh! The Entertainment Page
○ -CD-ROM Network
○ -Complete Gaming HeadQuarters
○ -Digital Nostalgia
○ -EINet's Gaming Resource

○ - MAIN   ○ - SEARCH   ○ - ADD   ○ - UPDATE

FIGURE 2J

Enter any field you want to search

Title:

First Name: Last Name:

Middle Name: (optional)

Phone#:

Address:

City: State:

Zipcode: Country:

Email:

URL:

Display how many entries at a time?

O - MAIN   O - SEARCH   O - ADD   O - UPDATE

FIGURE 2K

Submit a new entry to WebWho

Title: (The way you want your entry to appear in WebWho)

Name: (The way it appears on your credit card)

First Name: Last Name:

Middle Name:(optional)

Phone#1:

Phone#2(optional): Fax:(optional)

Address:

City: State:

Zipcode: Country:

Email:

URL#1:(optional)

URL#1:(optional)

Please enter your 20 keywords in the following text area.
Each keyword should not exceed 20 characters.
Remember to seperate each keyword by space(s).

Enter a description of your entry in the following text area.
It will be displayed along with your entry.

O - MAIN   O - SEARCH   O - ADD   O - UPDATE

FIGURE 2L

Choose a category

BUSINESS

☒ BOOKSTORE -STORE THAT SELLS BOOKS
☒ COMPUTER -COMPUTER COMPANIES.
☒ REAL ESTATE -BUYING AND SELLING PROPERTIES.
☒ WEDDING DESIGN -PLAN AND CORRDINATE WEDDINGS.

Or define your own

Category:

Description:

○ - MAIN   ○ - SEARCH   ○ - ADD   ○ - UPDATE

FIGURE 2M

ANNE HOGAN PERRY REALTOR

Anne brings to her clients the depth of her business background teamed with her strong commitment towards professionalism and client satisfaction. Anne view real estate as a team effort and partnership; her success stems from the success of her clients. Referrals from client were the key to Anne's achievement as Mary Worrall's Top Producer for 1994. Anne's focus areas have followed those of her clients. From the first time home buyer to high end sophisticated estate purchaser, all receive the same high levels of service and enthusiasm. Anne was born and raised on the "Gold Coast" of Oahu. Prior to moving back to Honolulu in 1993, she lived the past ten years on Maui and Kauai. Her Kamanina background teamed with her neighbor island exposure gives her a unique, in depth and first hand perspective on the statewide real estate market. Anne is one of the few brokers in Hawaii who has actively sold real estate on four islands.

Name: Perry, Anne H

Phone#1: 8087352411

Phone#2:

Fax:

Address: 4211 WALALAE AVENUE SUITE 100

City: HONOLULU  State: HI

Zipcode:96816 Country: USA

FIGURE 2N

Email: aperry@warrall.com

URL#1: http://www.worrall.com/estate/estate.shtml

URL#2: http://www.worrall.com/estate/estate.shtml

O - MAIN   O - SEARCH   O - ADD   O - UPDATE

FIGURE 2O

Edit your post, then press UPDATE

Title: (The way you want your entry to appear in WebWho)

Name: (The way it appears on your credit card)

First Name: Last Name:

Middle Name:(optional)

Phone#1:

Phone#2(optional): Fax:(optional)

Address:

City: State:

Zipcode: Country:

Email:

URL#1:(optional)

URL#1:(optional)

Please enter your 20 keywords in the following text area.
Each keyword should not exceed 20 characters.
Remember to seperate each keyword by space(s).

Enter a description of your entry in the following text area.
It will be displayed along with your entry.

O - MAIN   O - SEARCH   O - ADD   O - UPDATE

FIGURE 2P

Press BACK to edit the keywords and comments again. Otherwise, press the change button if you want to change category, or press the done button to update your entry.

---

The keywords you have entered are:

keyword1: HAWAII
keyword2: REALTOR
keyword3: HONOLULU
keyword4: REALESTATE
keyword5: OCEAN
keyword6: FRONT
keyword7: BROKER
keyword8: PROPERTIES
keyword9:
keyword10:
keyword11:
keyword12:
keyword13:
keyword14:
keyword15:
keyword16:
keyword17:
keyword18:
keyword19:
keyword20:

FIGURE 2Q

The following description will be displayed with your entry

Anne brings to her clients the depth of her business background teamed with her strong commitment towards professionalism and client satisfaction. Anne view real estate as a team effort and partnership; her success stems from the success of her clients. Referrals from client were the key to Anne's achievement as Mary Worrall's Top Producer for 1994. Anne's focus areas have followed those of her clients. From the first time home buyer to high end sophisticated estate purchaser, all receive the same high levels of service and enthusiasm. Anne was born and raised on the "Gold Coast" of Oahu. Prior to moving back to Honolulu in 1993, she lived the past ten years on Maui and Kauai. Her Kamanina background teamed with her neighbor island exposure gives her a unique, in depth and first hand perspective on the statewide real estate market. Anne is one of the few brokers in Hawaii who has actively sold real estate on four islands.

O - Change categories   O - Done update

O - MAIN   O - SEARCH   O - ADD   O - UPDATE

FIGURE 2R

Please enter the identification number of this post identification number:

O - MAIN  O - SEARCH  O - ADD  O - UPDATE

FIGURE 2S

Your post has been updated. Thank you!

---

○ - MAIN  ○ - SEARCH  ○ - ADD  ○ - UPDATE

FIGURE 2T

AUTOMATED ON-LINE INFORMATION SERVICE AND DIRECTORY, PARTICULARLY FOR THE WORLD WIDE WEB

This is a Continuation application of prior application Ser. No. 09/110,708 filed on Jul. 7, 1998, which is a Continuation application of application Ser. No. 08/572,543 filed Dec. 14, 1995 which issued as U.S. Pat. No. 5,778,367 on Jul. 7, 1998, the disclosures of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to on-line services, particularly to services for the World Wide Web.

2. State of the Art

The Internet, and in particular the content-rich World Wide Web ("the Web"), have experienced and continue to experience explosive growth. The Web is an Internet service that organizes information using hypermedia. Each document can contain embedded reference to images, audio, or other documents. A user browses for information by following references. Web documents are specified in HyperText Markup Language (HTML), a computer language used to specify the contents and format of a hypermedia document (e.g., a homepage). HyperText Transfer Protocol (HTTP) is the protocol used to access a Web document.

Part of the beauty of the Web is that it allows for the definition of device-, system-, and application-independent electronic content. The details of how to display or play back that content on a particular machine within a particular software environment are left to individual web browsers. The content itself, however, need only be specified once. In some sense, then, the Web offers the ultimate in cross-platform capability.

Pre-existing collections of information, however, such as databases of various kinds, can rarely be placed directly on the Web. Rather, gateway programs are used to provide access to a wide variety of information and services that would otherwise be inaccessible to Web clients and servers. The Common Gateway Interface (CGI) specification has emerged as a standard way to extend the services and capabilities of a Web server having a defined core functionality. CGI "scripts" are used for this purpose. CGI provides an Application Program Interface, supported by CGI-capable Web servers, to which programmers can write to extend the functionality of the server. CGI scripts in large part produce from non-HTTP objects HTTP objects that a Web client can render, and also produce from HTTP objects non-HTTP input to be passed on to another program or a separate server, e.g., a conventional database server. More information concerning the CGI specification may be accessed using the following Universal Resource Locator (URL):http://hoohoo.ncsa.uiuc.edu/cgi/interfac.html With the explosive growth of the Web, fueled in part by the extensibility provided by CGI scripts, the need for "finding aids" for the Web, i.e., tools to allow one to find information concerning a topic of interest, has grown acute. Many hard-copy volumes are presently available that are represented to be "White Pages" or "Yellow Pages" for the Web. Of course, hard copy information becomes rapidly out of date, and in the case of the Web, is out of date before it is even printed (let alone distributed), in the sense of failing to list many interesting resources newly made available on the Web.

The only effective solution is to have such finding aids be on-line, available on the Web itself. One such finding aid is a class of software tools called search engines. Search engines rely on automated Web-traversing programs called robots or spiders that follow link after link around the Web, cataloging documents and storing the information for transmission to a parent database, where the information is sifted, categorized, and stored. When a search engine is run, the database compiled through the efforts of the robots and spiders is searched using a database management system. Using keywords or search terms provided by the user, the database locates matches and possibly near-mateches as well.

An example of one such search engine is known as Yahoo, offered by Yahoo! Corporation of Mountain View, Calif., and may be accessed at the URL http://www.yahoo.com. Persons having pages on the Web, rather than simply waiting to have their Web page be found by a robot or spider, can also have their Web page listed in the Yahoo database by providing information concerning the resource they wish to list and paying a fee. The result is an on-line-searchable directory of Web resources that is regularly updated.

While such services are indeed extremely useful, nevertheless, from the standpoint of a person wishing to publicize their Web site, they are typically attended by a number of drawbacks. In particular, the person wishing to publicize their Web site typically has very limited control of the content of the resulting listing. Submissions, including textual description and suggested categories, are often subjected to editorial control that may range from strict to arbitrary. As a result, a listing may be placed under an entirely different category from the category intended by the person making the submission. Furthermore, the textual description may be heavily edited (in some instances almost beyond recognition)—or even deleted—depending on the exaction of the editor. Because of this editorial process, posting of the listing is not immediate. Furthermore, once the listing has been posted to the database, if the person making the listing later wishes to change the listing in some respect, the change must again pass through the same laborious channel. Hence, the process of adding and updating listings is inconvenient and unsatisfactory.

Moreover, the nature of the listing is rather prosaic. The listing is in title/brief-description format and does not include graphical elements or otherwise appeal to the artistic sensibilities of the viewer. In this sense, the listing is comparable to the standard telephone book listing, which appears in plain text, nothing added, as compared, say, to a quarter-page advertisement with custom artwork and the like.

To use the foregoing service, one is required have a Web homepage. If a user has no Web presence but wishes to establish one, the foregoing service is entirely unavailable. The typical user must first establish a Web presence by paying a Web consultant to produce a homepage and then paying an Internet Service Provider to house that homepage on the Web. This undertaking can prove to be quite costly for an individual or a small business.

What is needed, then, is an information service that overcomes the foregoing disadvantages.

SUMMARY OF THE INVENTION

The present invention, generally speaking, uses a computer network and a database to provide a hardware-independent, dynamic information system in which the information content is entirely user-controlled. Requests are received from individual users of the computer network to electronically publish information, and input is accepted from the individual users. Entries from the users containing the information to be electronically published are automatically collected, classified and stored in the database in searchable and retrievable form. Entries are made freely accessible on the computer network. In response to user requests, the database is searched and entries are retrieved. Entries are served to users in a hardware-independent page description language. The entries are password protected, allowing users to retrieve and update entries by supplying a correct password.

Preferably, the process is entirely automated with any necessary billing being performed by secure, on-line credit card processing. The user making a database entry has complete control of that entry both at the time the entry is made at any time thereafter. The entry, when served to a client, is transformed on-the-fly to the page description language. Where the page description language is HTML and the computer network is the World Wide Web, the entry may function as a "mini" homepage for the user that made the entry. Provision is made for graphics and other kinds of content besides text, taking advantage of the content-rich nature of the Web.

Because the user controls both the content of an entry and the manner in which it is classified, the database functions as a directory to allow the Web public to quickly and precisely find current and accurate data about the user, the user's products and services, etc., without requiring the user to have a conventional Web homepage. The user's mini homepage can be included in many different categories, with the user having the flexibility to change the categories or the descriptive content of the page at any time. Preferably, hyperlink services are also provided, by including within the page links to an E-mail address or to one or more other conventional homepages (or other mini homepages). The E-mail address may be a private E-mail address established on the host machine, avoiding the need to obtain a conventional E-mail address. An inexpensive way is therefore provided to set up a Web site with key information that might otherwise be very costly to widely distribute, and to achieve an Internet presence with a minimum of effort and expense.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1A:
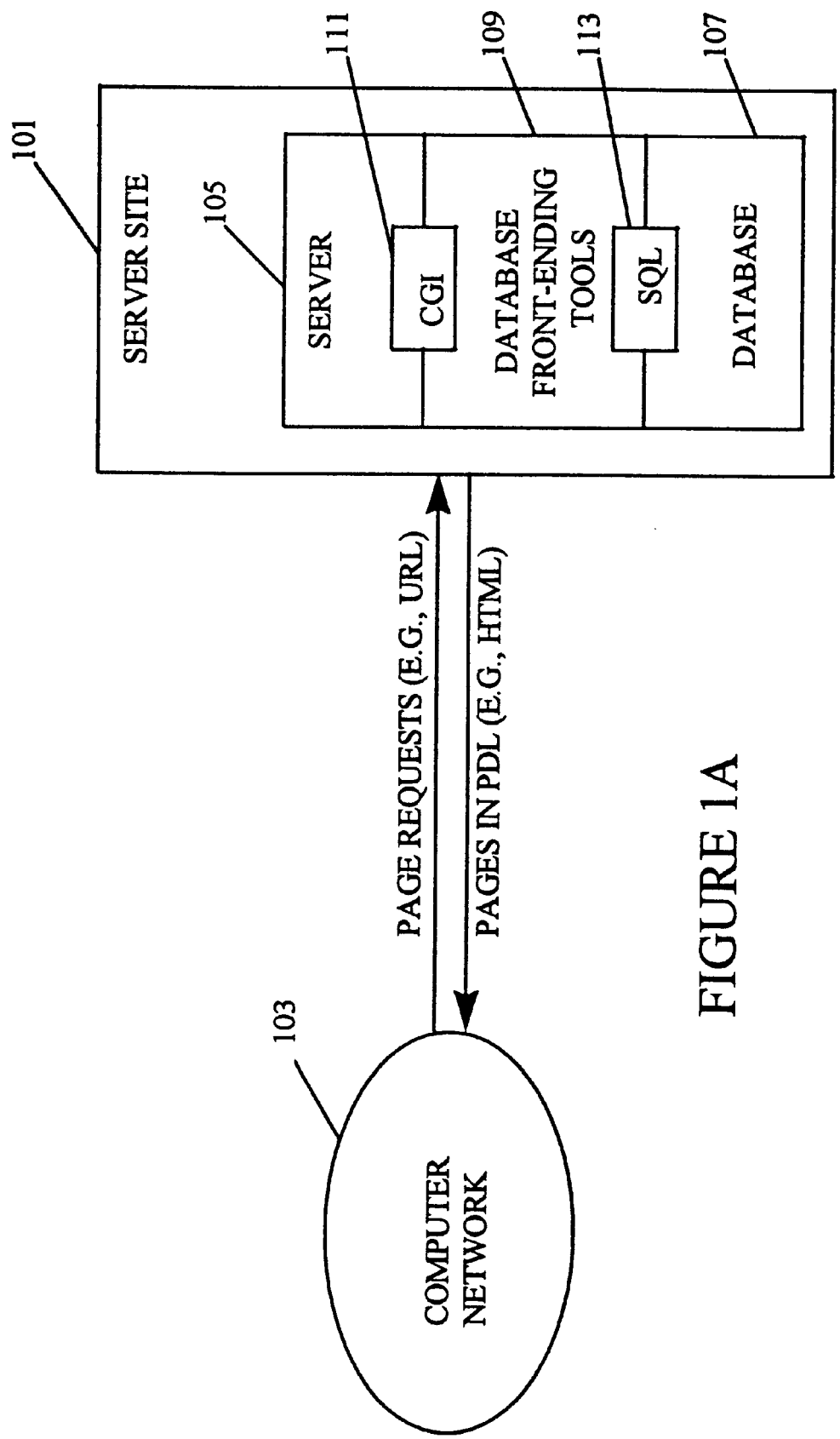
FIGS. 1A and 1B are simplified block diagrams of alternative embodiments of the system of the present invention.

Referring to FIG. 1A, there is shown a simplified block diagram of the system of the present invention. A server site 101 is connected to the a computer network 103 such as the Web or a Wide Area Network (WAN) other than the Web. At the server site, server software runs on a suitable server platform. In the case of the Web, for example, the server of FIG. 1A might be a server available from the National Center for Supercomputing Applications (NCSA), or a secure server package of a known, commercially-available type, running on a super-minicomputer such as a SunServer machine available from Sun Microsystems of Menlo Park, Calif., or on any of a wide variety of suitable UNIX platforms. Also running, either on the same machine or a network-accessible machine, is a database management system 107. Preferably, the database management system 107 supports Standard Query Language, or SQL. One suitable database management system is MiniSQL, which is also commercially available.

Figure 1B:
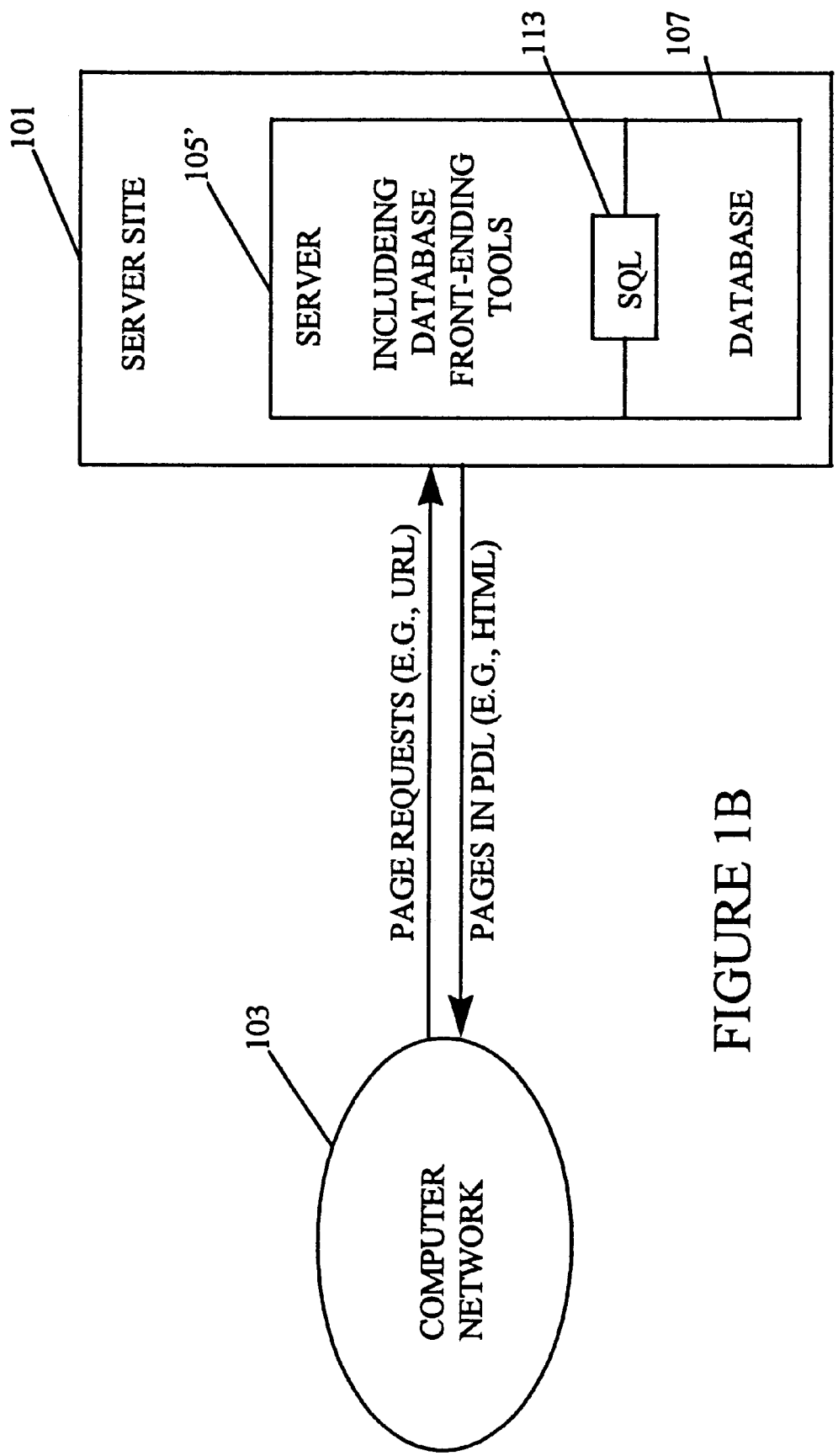

SQL databases, however, are not inherently "Web-friendly." Accordingly, a variety of HTML front-ending tools 109 are provided which run as extensions to the server software, allowing computer network users to each add entries to a database, search entries in the database, and update entries by that particular user, all using the Web (or a Web-like) graphical user interface. The server software and the HTML front-ending tools communicate through the Common Gateway Interface 111. In accordance with another embodiment, shown in FIG. 1B, the HTML front-ending tools may be fully integrated with the server software. The HTML front-ending tools and the database communicate through SQL (113).

When a network user visits the server site, the user is served a main page in a page description language such as HTML. The user interacts with the page, making selections or requests. These selections or requests, although they may not appears as such to the user, are in effect page requests, e.g., URLs that access a page directly or that call a CGI script to perform some sort of processing. The result of the selection or request may be a page eliciting a further selection or request, or may be contain the desired information itself.

In order to convey the manner in which the automated information service and directory is used, screen displays of the graphical user interface will now be described.

Figure 2A:
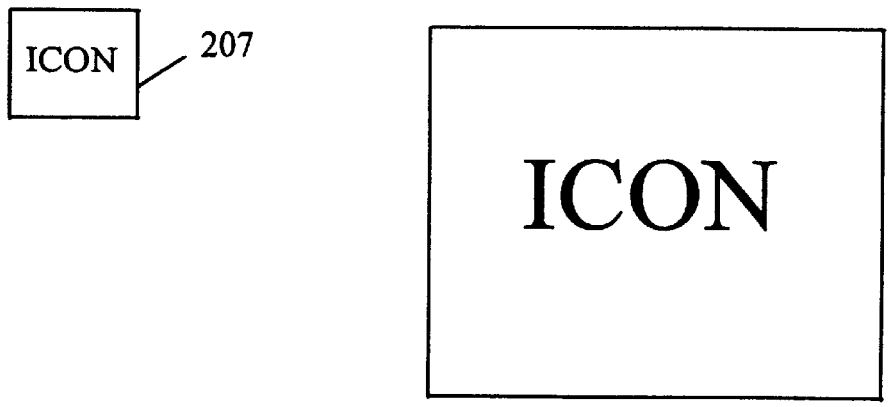
FIG. 2A through FIG. 2-O are screen shots showing use of the system and method of the present invention.
Figure 2A:
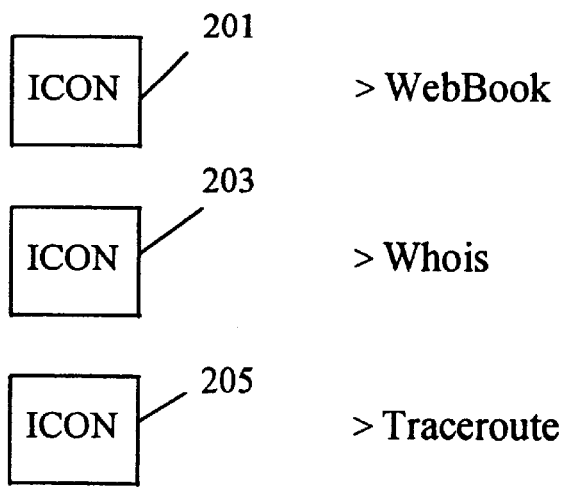

When a user first visits the site, he or she is presented with a main page as shown in FIG. 2A. Along the side of the page are icons that may be clicked on to select different services. An icon 201 selects a "WebBook" service in which database entries may be searched, viewed and updated. An icon 203 selects a "WebWho Whois" service, providing a graphical front end to the United States Whois database, with additional hypertext link integration. An icon 205 selects the "WebWho Traceroute" service, providing a graphical front end to the Traceroute utility, again with additional hypertext link integration. An icon 207 in the top left shows the current page's icon and is not linked.

Figure 2B:
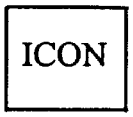

When the icon 201 is selected, the user is presented with a page like that shown in FIG. 2B. At the top of the page appears a table 209 presenting examples of valid entry types for Whois, i.e., Domain Name, Machine Name, Registered Handle, Registered Name, IP Address and IP Network. Next appears a text input field 211 to receive the information to be looked up. Next appears an example of the results of a specific lookup. The user has input his or her request, and results have been received back and displayed in a results area 213. As described more fully below, links are embedded in the results such that, by clicking on an area 215 displaying ccoley@SRMC.COM, for example, an E-mail utility will be invoked showing a blank E-mail addressed to ccoley@SRMC.COM. Similarly, domain names, IP addresses, etc. may be clicked on, with the result that Whois is queried once again with respect to the selected information.

At the bottom of the page appears a Navigational Aid 217 used throughout the user interface where appropriate to allow the user to return directly to a particular entry point in the program flow without having to follow numerous links as is typical of the prior art.

When the icon 203 is selected, the user is presented with a page for the Traceroute utility like that shown in FIG. 2C. The various features of the page will be evident from the preceding description. One feature, however, bears particular mention. That is, just as clicking a domain name or the like in Whois produces a further query, bringing up additional information, similarly, clicking on names or addresses in FIG. 2C also produces a further query, not of Traceroute but of Whois. For example, if one wanted to find additional information about the machine on line number of 1 of FIG. 2C, one could simply click on the IP address 205.138.192.1 displayed in the area 219. This action would produce the same result as if the user had copied down the IP address, navigated to Whois and entered the IP address in the lookup field.

Figure 2D:
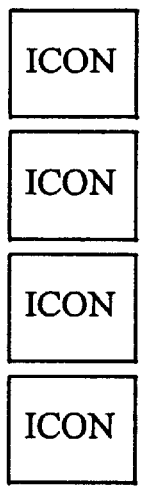

When the icon 205 is selected, the user is presented with a page like that shown in FIG. 2D. The navigation aid previously described, although not shown in FIG. 2D, may also be included if desired. The user is given the options of searching the database, adding a new entry, updating an existing entry, changing the user's password, or logging in. As described below, login is typically not required to view a listing of entries satisfying a particular search request, although login may be required to view an actual entry itself and is required to update an entry.

When the Search option is selected, the user is presented with a page like that shown in FIG. 2E. Within WebBook, a different type of navigational aid 221 is included that allows the user to quickly move about within WebBook, between Search, Add and Update, or to go to the main page of FIG. 2A. The screen of FIG. 2E allows the user to select between different searching methods, including searching by Categories (going through a categories list), by Example (querying each field of the entries), and by Keyword (specifying a keyword).

Figure 2F:
Figure 2F:
Figure 2F:
Figure 2F:

When Categories is selected, the user is presented with a page like that shown in FIG. 2F. In the example shown, three root-level categories are presented, BUSINESS, RECREATION, and WEBWHO95. The user selects one of these categories to show further subcategories, as seen in FIG. 2G, which is displayed in response to the user selecting WEBWHO95. A single subcategory is shown—INDEX, having 9250 entries. The entries are listed by title within the lower part of the page. The user may select how many entries are to be displayed at a time in order to quicken response time. Also, presorts are used in order to quickly display the results of a category or keyword search.

Figure 2H:
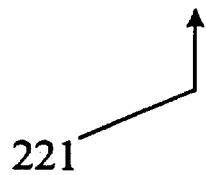

When Example is selected, the user is presented with a page like that shown in FIG. 2H. The user enters the information to be searched in any field or combination of fields to be searched.

To add a new entry to the database, the user is presented with a page like that shown in FIG. 2I. Each information item in the upper portion of the form is required, unless otherwise indicated. If a required item is not provided, the program will redisplay the form and request the user to complete all required items. Optional items include middle name, alternate phone number, fax number, URL#1, and URL#2.

The remainder of the form is used to enter up to twenty keywords and a description of the user's entry, to be displayed with the entry.

Following entry of keywords and a description of the entry, the user is requested to choose a category for the entry by presenting the user with a page like that shown in FIG. 2J. The user can navigate the category tree until he or she has located the desired category and then select that category. If none of the categories is adequate, then the user may define his or her own category, by entering the name of the category and a short description of the category. The new category will then be added to the category tree.

A sample mini homepage is shown in FIG. 2K. The mini homepage may be located by searching the database and then selecting the corresponding entry, or may be retrieved directly by URL. The URL of the mini homepage itself should not be confused with URL#1 and URL#2 listed on the mini homepage. The latter refer to independent resources. The URL of the mini homepage itself is, for example, based on a unique transaction ID assigned to each entry and may be entered into a browser program to view the mini homepage directly without searching.

When Update is selected (FIG. 2D), the user, having entered the correct transaction ID and password, is presented with a page like that shown in FIG. 2L. The corresponding mini homepage is displayed, and the user is requested to update the mini homepage (the "post"). When the user has edited the entry to his or her satisfaction, the user presses UPDATE. The user is then presented with a further page like that shown in FIG. 2M, giving him or her the opportunity to review one final time the comments and keywords. To change the comments or keywords, the user presses BACK. The user can also change the category of the entry by pressing the Change category button. To accept and complete the update, the user presses a Done update button.

A page like that shown in FIG. 2N is then presented. The user is required to enter the identification number of the post. If the identification number is entered correctly, the post is updated, and a page like that shown in FIG. 2-O is presented to the user, confirming the update.

Figure 3:
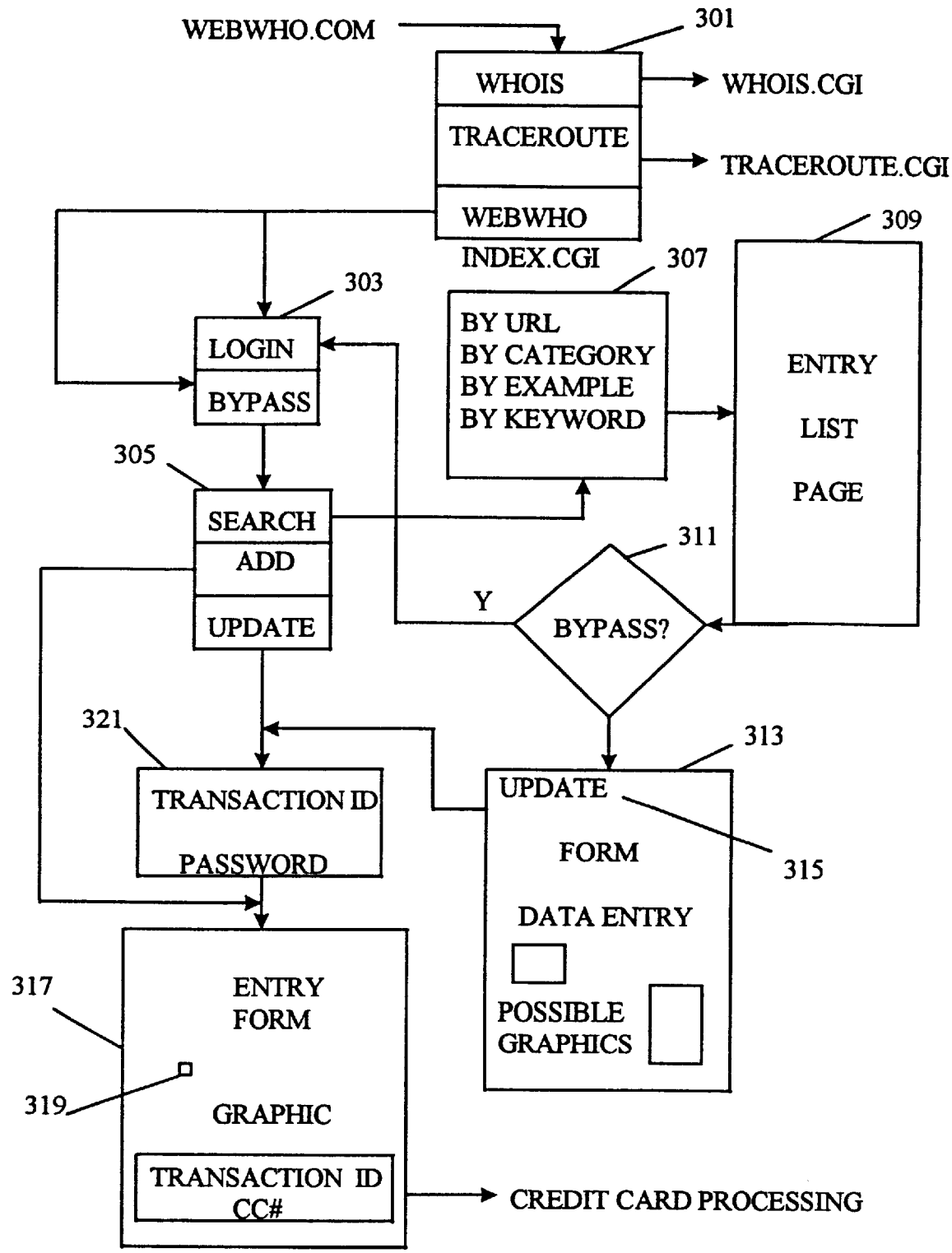
FIG. 3 is a flowchart of the operational steps involved in the present system and method.

Referring now to FIG. 3, the operational steps involved in the present system and method are represented. The system is accessed either directly by the user or by following a link to the server site, for example the URL WebWho.com. The name WebWho™ is a trademark of the present assignee.

The user is first presented with a page 301 (index.shtml) allowing the user to select from different services, including whois and traceroute. As described previously, whois is an Internet service that looks up information about a user in a database. Traceroute is a program that permits a user to find the path a packet will take as it crosses the Internet to a specific destination. Whois and traceroute are known services. Previously, however, use of these services has typically required "root-user access" on a UNIX host. In accordance with one aspect of the present invention, these services are HTML front-ended and made available to all users, together with further hyperlink services that greatly increase the utility of the underlying whois and traceroute services.

Figure 5:
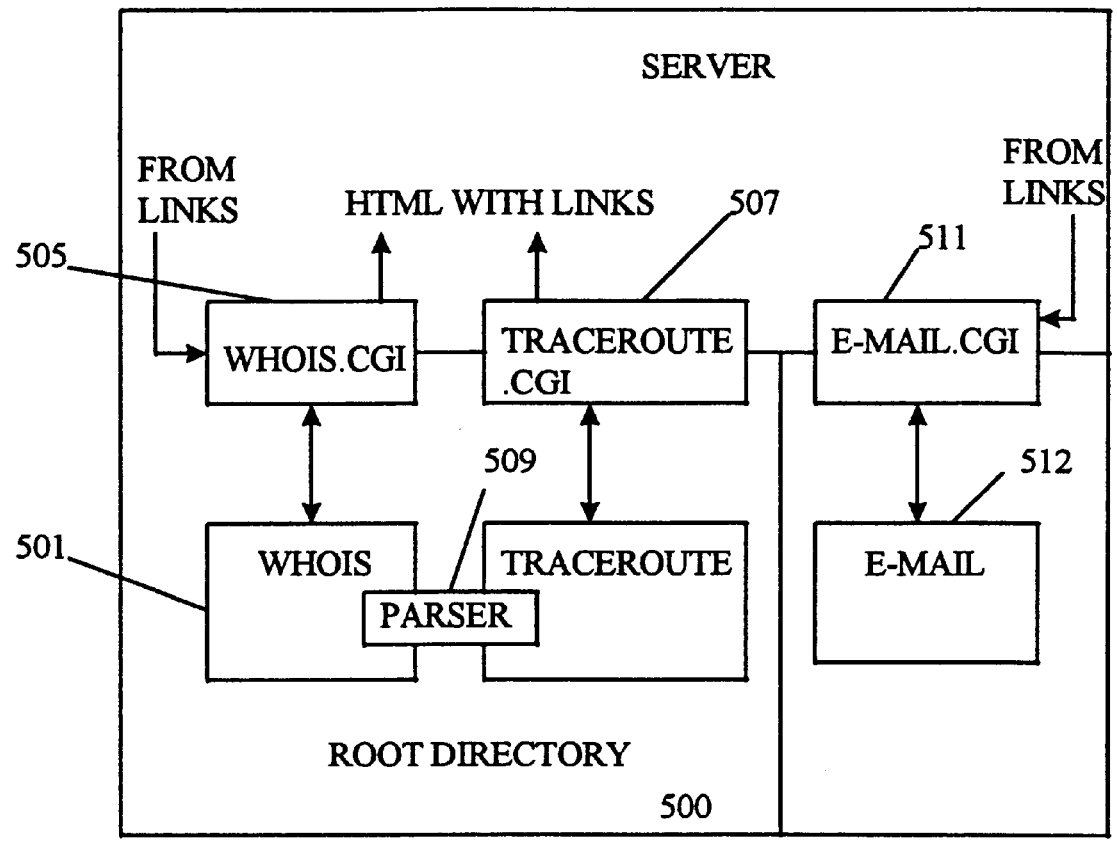
FIG. 5 is a simplified block diagram showing the manner in which whois and traceroute services are made readily available through HTML front-ending and augmented with hyperlink services.

Referring to FIG. 5, whois and traceroute are made readily available to all network users through HTML front-ending using CGI scripts. The actual whois code 501 and traceroute code 503 remains within the root directory 500 on a UNIX host. Respective CGI scripts are provided, namely whois.cgi (505) and traceroute.cgi (507), that have root user privileges and that provide HTML front-ending between the user and their respective services. For example, when a user selects the WebWho Whois service from the main page of FIG. 2A, the whois.cgi script 505 is invoked to pass the user input to the root directory whois service 501 and cause it to service the user's request. Output from the root directory whois service 501 is passed back from the whois.cgi script 505 in HTML format. The same description applies equally to the traceroute.cgi script and the root directory traceroute service.

To further augment the whois and traceroute services, hyperlink services are provided. The root directory whois and traceroute services are provided with a parsing routine 509 that parses the output of these services to identify E-mail addresses, domain names, IP names, etc.—character strings containing period separators and/or the character "@." The parser then passes back this information to the CGI scripts in the form of links, links to the whois.cgi script 505 in the case of names and links to an E-mail.cgi script 511 in the case of E-mail addresses. The E-mail.cgi script 511 controls an E-mail utility 513 that may be located in the root directory or in a different directory.

Whois and traceroute, as implemented as part of the present invention, provide powerful new tools for serious Internet tools. Using whois, the user may type in any address with a ".com", ".edu" or ".net" extension and find the physical address, phone number and the individual(s) that the address represents. This ability may be used as a powerful marketing tool to find a wealth of information about people on the Internet. Also, whois can be used to instantly check a domain name.

Traceroute may be used by System Administers to obtain information to make their jobs much easier. Previously, System Administrators have not been allowed to use traceroute on a PC running any operating system other than UNIX.

Whereas whois and traceroute are more technically oriented, "WebBook" allows non-technical users to take advantage of the capabilities of the Web with a minimum of effort. WebBook allows a user to have HTML-front-ended access to a database of mini homepages in order to search, add entries to, or update previous entries in the database.

Referring again to FIG. 3, if WebBook is chosen, a login routine 303 may request the to enter identifying information of the type that would normally be found on a business card, for example. Presently, although Web sites are able to track the user's access point to the Web (for example, a particular slip connection through an Internet Service Provider), this information often gives no indication who the user really is. Such information is important in order to evaluate the extent to which a target audience is being reached.

The user may choose an options that allows the user to bypass the login request. The request for information as to the identity of the user therefore may or may not be complied with; moreover, the information provided may or may not be accurate. As an incentive to provide the requested information (and, it is hoped, the correct information), users providing the requested information may be given more complete access to the database than users who do not provide the requested information. Users providing the requested information are assigned a user ID to be used during subsequent accesses and are requested to choose a password. The password may be required to access some system services. To further encourage voluntary login, users that have complied with the login request and have been assigned a user ID may be afforded the ability to customize the user interface and maintain the resulting look and feel between uses. This customization is performed in a known manner by storing on the host a user preferences file and accessing the file to restore user preferences when a valid user ID is provided.

For a period during the initial stages of the service, while the database is still being built up, it may be desirable to allow all users complete access to the database regardless of whether or not they have identified themselves.

Following the login procedure, the user is provided with a page 305 presenting the different ways that the user may interact with the database. For example, a user may search the database, add a new entry to the database, or update a previous entry to the database by that user. Each of these options will be described in turn.

If the user chooses to search the database, the user is provided with a page 307 concerning different search options. A search may be performed on one or more of a number of different database fields, depending on the organization of the database entries. For example, in a preferred embodiment, the database entries include the following defined fields:

| | |
|---|---|
| uid | country |
| fname | email |
| lname | url |
| mname | keywords |
| title | comment |
| ident | category |
| phone 1 | active |
| phone 2 | start_date |
| fax | expire_date |
| addr | info1 (Reserved) |
| city | info2 (Reserved) |
| state | info3 (Reserved) |
| zipcode | info4 (Reserved) |

In one embodiment, searches may be performed by category, by keyword, by URL, or by example. To facilitate rapid retrieval of information, presorted listings may be stored for each category and keyword or for some number of the most common categories and keywords. To search by example, the user is provided with a form having the same organization as the database entries. The user fills in information in the fields of interest. The search then returns information concerning entries having matching information in those fields. Entries are displayed in list fashion by title on a page 309.

The number of entries produced by a search may be very large. Therefore, instead of displaying a listing for all of the entries at once, the entries may be displayed ten at a time, for example. Alternatively, only the first 100 or 200 entries may be displayed.

While some sites may provide information and services free of charge, for example as a result of volunteerism or advertising subsidies, other sites may have a business model in which users are charged for information or services or both. For such a site, it becomes critical to protect the information stored in the database. Therefore, unlike some existing databases in which actual hypermedia links to Web homepages are stored in the listed items, in order to prevent effectual pirating of the database, links are embedded only in the full entry itself, not in the entry listings. Otherwise a user could simply store a voluminous listing or various different listings, with their accompanying hypermedia links, and thereby capture in large part the entire benefit of the database. Instead, an item in a listing is intended only to give the user enough information to gauge the user's further interest in an item. If the user is interested in an item, the user may select that item, causing the full-page entry to be provided. The full page entry includes links to any E-mail address or URL that the owner of the entry may have provided, thereby providing a link to that person's or organization's homepage (or to some other homepage).

If the user bypassed login, as determined in step 311, he or she will normally be returned to the login procedure when attempting to select an entry to view it in its entirety. If the user has logged in, then the user may select an entry and the corresponding full page 313 will be served to the user.

The full page entry 313 need not be limited to text alone but may be a complete hypermedia page, including possible graphics or other non-textual content In this manner, for person's or organizations not having any independent Web homepage, the entry can function as a "mini-homepage," i.e., a single page hypermedia document. Furthermore, the mini-homepage may have its own URL, allowing it to be accessed directly without performing a search of the database. For example, a URL for a mini homepage might be http://webwho.com/view?id=xxxx, where xxxx represents a transaction ID assigned to each entry in a manner described below.

A link 315 is embedded in the mini-homepage to allow for the page to be updated. Prior to describing the manner in which the mini-homepage is updated, however, the manner of adding a new entry to the database will first be described.

In order to add an entry to the database, a user must login, during which the user chooses a password, or must have logged in during a previous visit to the site. When the user chooses to add a new entry to the database, a unique transaction ID is created for that entry, to be used throughout the life of the entry. A unique transaction ID may be created in any of many different ways. For example, the transaction ID might be the date (e.g., 951215) and the entry number for that date (e.g., 00215). Alternatively, the transaction ID might be the time of day (e.g., HHMMSS) and the process ID of the host machine process that is servicing the user's request. In one embodiment, the transaction ID is a 14-digit hexadecimal number in which eight digits represent the number of seconds since an arbitrary date (e.g., Jan. 1, 1970), four digits represent the process ID running on the host machine, and two digits represent a portion of the machine IP address (to distinguish between different host machines).

Once a trasaction ID has been assigned, the user is then provided with an entry form 317 having fields corresponding to the various fields of a database entry as described previously. The user fills out the form and presses a screen button when the entry is complete. The form may have one or more checkboxes 319 to indicate the desire to include with the entry one or more non-textual elements, such as a graphic image, etc. Also, if desired, different templates may be provided governing the appearance of the finished page, with the user selecting a desired template.

Non-textual content may be obtained from the user in any of a number of different ways. For example, the user may transfer to the site a file containing the non-textual content using the File Transfer Protocol (FTP) with the same user ID and password as when the entry was added.

During the entry process, the user is prompted to enter keywords to facilitate later searching of the database and location of the entry. Furthermore, the HTML front-end tools may assist in developing keywords for the entry. A pre-search/sort tool, for example, might take the 2000 top keywords found in the database within the keyword field and do a total text search throughout the database for these keywords. If one or more of these keywords appears in the description ("comment" field) of an entry but not in the keyword list, these keywords are then added to a keyword extension field for up to some number of keywords, e.g. five.

If the server site is based on a pay-for-service model, the form will also call for the user to enter a credit card number as the last piece of information. Secure, on-line credit card processing will then be performed to bill the user, either on a one-time basis, on a periodic basis, or on an occasional basis as future services may require. Although various methods of processing credit card transaction on-line have been proposed, with various degrees of attendant security, such processing is preferably performed in accordance with a proprietary method developed by the assignee to provide the highest level of security possible.

After an entry has been made, it may be updated at any time by one able to provide the transaction ID assigned to the entry and the user password, i.e., by the user or one acting on behalf of the user. The update option may be entered directly, or the entry to be updated may first be viewed as the result of a search and the update screen button 315 then pressed. The user is then prompted to supply the correct transaction ID and password (page 321), failing which the user will not be allowed to update the entry.

If the transaction ID and password are correctly supplied, then the equivalent of a new entry form will be provided to the user will the current information pertaining to the entry already filled in. The user may then modify the entry. If a charge is made for updating the entry, preferably the credit card information from the earlier creation of the entry will have been stored in a highly secure fashion, avoiding the need to reenter the information. Both security and convenience are thereby enhanced.

Nothing in the process of adding, searching and updating entries requires manual intervention. Rather, the entire process is automated and may be made available continuously, 24 hours a day, 365 days a year. Like a publicly-accessible bulletin board, the content that is posted on the database is entirely within the control of the user, both at the time the entry is posted and all times thereafter.

Figure 4:
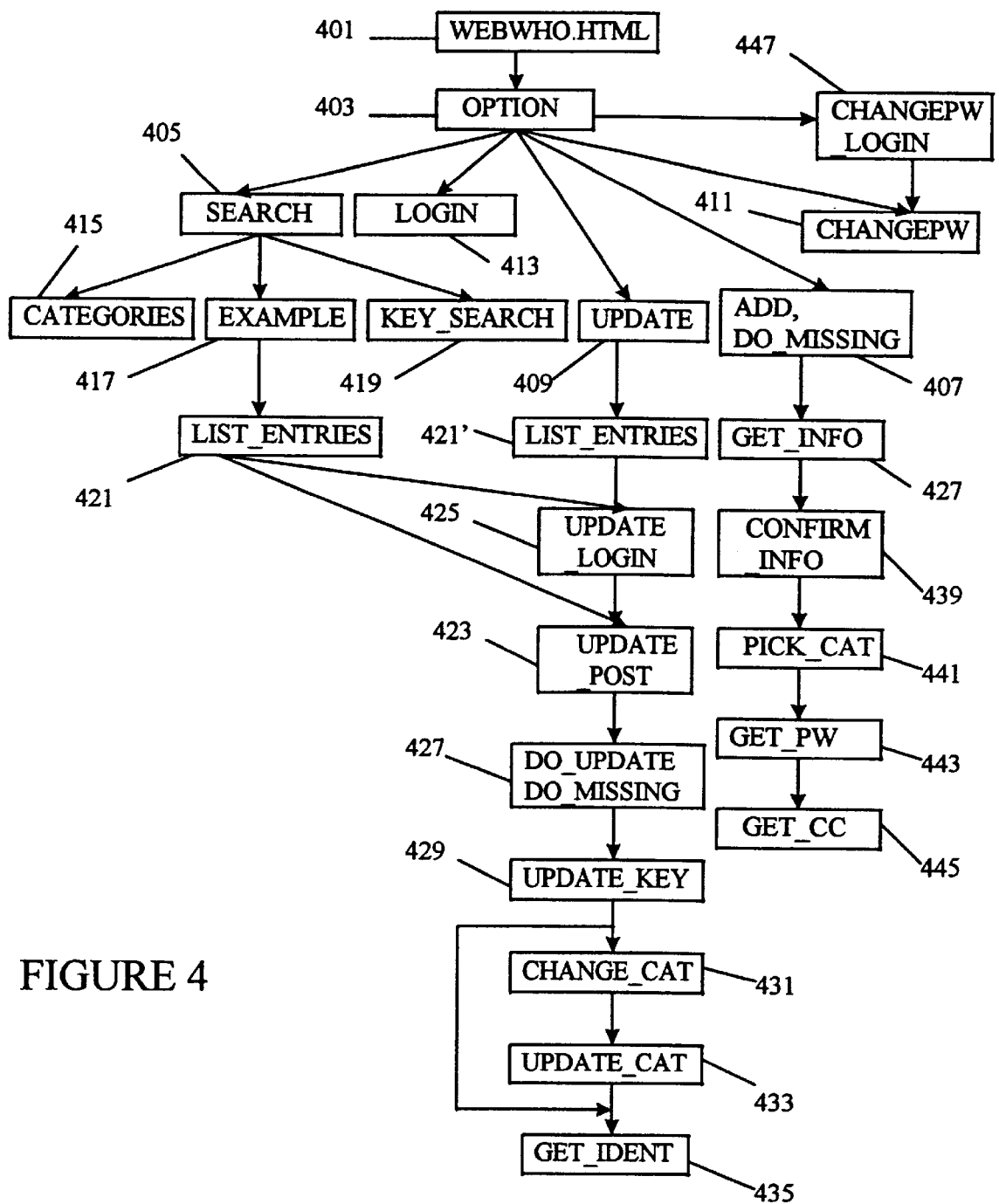
FIG. 4 is a block diagram showing various ones of the HTML front-ending tools of FIG. 1 and their functional interrelationships.

Referring now to FIG. 4, various ones of the HTML front-ending tools of FIG. 1 and their functional interrelationships will now be described.

When a user visits the site and the WebWho option is selected, a page WebWho.html (401) is served to the user, offering the user various options, including, for example, options to search the database, add a new entry, update an existing entry, change the user's password, or to log in if the user has not previously done so. In an exemplary embodiment, the routines illustrated in FIG. 4 are standard C routines, called from a single CGI script In other embodiments, the routines may be called by separate scripts, and may be written other languages such as in a UNIX shell language, or in one of a number of emerging Internet computer languages such as Java.

The Options routine 403 reads in the user's choice and invokes one of the five following routines: Search (405), Add (407), Update (409), Changepw (411), and Login (413). Each of these options will be described in turn.

If Search is chosen, the Search routine 405 initiates one of several possible search functions. In a preferred embodiment, these functions include a categories search, an example search, and a keyword search. According to the search function chosen, the Search routine invokes one of the following routines: Categories (415), Example (417), and Key_Search (419).

Categories are represented in computer memory in the form of a tree structure. A categories search starts from the root level, with the Categories routine 415 displaying all the categories available at that level, and all the entries (or up to some number of entries) belonging to that level. The user can click on any category to go to the next level, and can click on any entry to bring up the mini page of the entry.

If Example is chosen, the Example routine 417 displays a form for the user to fill in any field he or she wants to search on. The Example routine 417 reads in the information and displays all the entries that match what has been specified.

If Keyword is chosen, the Key_search routine 419 displays text boxes to read in up to a specified number of keywords (e.g., four) to search on. The Key_search routine 419 displays all the entries that match the specified keywords.

When a user clicks on one of the entries returned by a search function, the mini page is displayed by a List_entries routine 421. List_entries displays the mini page for a particular entry and also contains an update button for the user to update that particular entry.

When a user specifies that he or she wants to edit the entry currently being displayed, the Update routine 409 performs a check to see if that page belongs to the user currently logged in. If so, updating is initiated by invoking an Update_post routine 423. Otherwise, an Update_login routine 425 is called to allow the user to perform the correct login sequence. The Update_login routine 425 reads in a user ID and password and matches them against the database to determine if the user is the owner of the mini page currently being displayed. Updating is not allowed until the correct user ID and password are entered.

The Update_post routine 423 displays an entry form with values filled in from the information stored in the database. It invokes a Do_update routine 427 to process the new values being entered. The Do_update routine reads in the new information, makes sure that all the required information is filled. If not, a routine Do_missing is invoked. When all of the required information has been supplied, a Update_key routine 429 reads in the keywords and comments from the database entry, displays them, and asks the user to confirm. The user can go ahead and update the database or can change the category the entry currently belongs to.

If the user chooses to change the category, a Change_cat routine 431 displays all the categories at the root level. The user can click on one of the categories to go to the next level or can specify a new category on the current level. If the user chooses to go ahead and update the database, another form is displayed to read in the identification number of the entry. A Get_ident routine 435 is then invoked. If the user chooses to change the category, an Update_cat routine 433 handles navigation through the categories tree. It will keep displaying the categories on the current level until the user has decided on a category or has specified a new category.

The routine Get_ident 435 reads in the identification number and matches it against the identification number stored in the database for the current entry. If they match, the database is updated; otherwise, the program declines the update.

Entries may also be updated directly without searching, using the Update routine 409. If a user is currently logged in, the Update routine 409 displays all the entries belonging to that user. Otherwise, the Update_login routine 425 performs a login and displays all the entries belonging to the newly logged-in user. The remaining update routines have already been described as a continuation of the search options and will therefore not be further described.

When Add is selected, the Add routine 407 displays an empty form to allow the user to fill in all the information. The Add routine 407 processes the information that has been entered, using the Do_missing routine to make sure that all the required information is entered. The Do_missing routine displays the form again until all the required information is entered.

After all the required information has been entered, a Get_info routine 437 displays another form to read in the keywords and comments. A Confirm_info routine 439 processes the keywords and comment being entered and displays them again, asking the user to confirm. After the user confirms the keywords and comments, a Pick_cat routine 441 acquires the category using the same mechanism previously described in relation to Update_cat. If the user is not logged, in he or she is logged in, and a new user ID is determined. A form is then displayed to read in the user's password. A Get_pw routine 443 reads in the password and displays a form to read in credit card information. A Get_cc routine 445 verifies the credit card information. If the transaction is authorized, it adds the new entry into the database; otherwise, it rejects the entry.

The remaining routines are administrative in nature. The user may wish to change his or her password. If the user is not currently logged in, a login is performed by calling a Changepw_login routine 447. Changepw_login reads in the user ID and password and matches them against the values in the database. A form is then displayed to read in the new password. The Changepw routine 411 actually updates the database with the new password.

The Login routine 413 reads in the user ID and password and checks them against the database. If the user ID and password are correct, operation begins at the main page with the user logged in as the new user.

It will be appreciated by those of ordinary skill in the art that the invention can be embodied in other specific forms without departing from the spirit or essential character thereof. The foregoing description is therefore considered in all respects to be illustrative and not restrictive. The scope of the invention is indicated by the appended claims, and all changes which come within the meaning and range of equivalents thereof are intended to be embraced therein.

What is claimed is:

1. A method for maintaining a network accessible database on a server processing system comprising:

receiving a request from a client processing system connected to said server processing system over a network for a user to add a record to said network accessible database;

receiving user authorization information from said client processing system;

determining whether a user is authorized to add said record from said user authorization information responsive to receiving said user authorization information;

receiving said information to be included in said record responsive to transmitting said request;

generating said record with said information;

storing said record in said network accessible database; and storing an identification of said user indicating said user is authorized to modify said record in said network accessible database.

2. The method of claim 1 wherein said information includes non-textual content.

3. The method of claim 2 wherein said non-textual content includes an image.

4. The method of claim 2 wherein said non textual content is included in a file.

5. The method of claim 1 wherein said information includes a description of information provided by said user over said network.

6. The method of claim 1 wherein said step of generating said record includes:

generating a display of said information accessible over said network.

7. The method of claim 6 wherein said display is a web page.

8. A product for maintaining a network accessible database on a server processing system comprising:

instructions for directing a processing unit to:
receive a request from a client processing system connected to said server processing system over a network for a user to add a record to said network accessible database,
receive user authorization information from said client processing system,
determine whether a user is authorized to add said record from said user authorization information responsive to receiving said user authorization information,
receive said information to be included in said record responsive to transmitting said request,
generate said record with said information,
store said record in said network accessible database, and store an identification of said user indicating said user is authorized to modify said record in said network accessible database; and a media readable by said processing unit that stores said instructions.

9. The product of claim 8 wherein said information includes non-textual content.

10. The product of claim 9 wherein said non-textual content includes an image.

11. The product of claim 9 wherein said non-textual content is included in a file.

12. The product of claim 8 wherein said information includes a description of information provided by said user over said network.

13. The product of claim 8 wherein said instructions to generate said record includes:

Instructions for directing said processing unit to:
generate a display of said information accessible over said network.

14. The product of claim 13 wherein said display is a web page.

15. An apparatus for maintaining a network accessible database on a server processing system comprising:

means for receiving a request from a client processing system connected to said server processing system over a network for a user to add a record to said network accessible database;

means for receiving user authorization information from said client processing system;

means for determining whether a user is authorized to add said record from said user authorization information responsive to receiving said user authorization information;

means for receiving said information to be included in said record responsive to transmitting said request;

means for generating said record with said information;

means for storing said record in said network accessible database; and means for storing an identification of said user indicating said user is authorized to modify said record in said network accessible database.

16. The apparatus of claim 15 wherein said information includes non-textual content.

17. The apparatus of claim 16 wherein said non-textual content includes an image.

18. The apparatus of claim 16 wherein said non textual content is included in a file.

19. The apparatus of claim 15 wherein said information includes a description of information provided by said user over said network.

20. The apparatus of claim 15 wherein said means for generating said record includes:

means for generating a display of said information accessible over said network.

21. The method of claim 20 wherein said display is a web page.

* * * * *